(12) United States Patent  
Kurokawa et al.

(10) Patent No.: US 9,166,432 B2  
(45) Date of Patent: Oct. 20, 2015

(54) CHARGE CIRCUIT

(71) Applicants: Gentaro Kurokawa, Tokyo (JP); Daisuke Suzuki, Tokyo (JP); Toshiki Sakamoto, Tokyo (JP)

(72) Inventors: Gentaro Kurokawa, Tokyo (JP); Daisuke Suzuki, Tokyo (JP); Toshiki Sakamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 325 days.

(21) Appl. No.: 13/756,627

(22) Filed: Feb. 1, 2013

(65) Prior Publication Data

US 2013/0207597 A1    Aug. 15, 2013

(30) Foreign Application Priority Data

Feb. 14, 2012 (JP) ................................ 2012-029129

(51) Int. Cl.
*H02J 7/00* (2006.01)
*H05B 37/02* (2006.01)

(52) U.S. Cl.
CPC ............ *H02J 7/0052* (2013.01); *H02J 7/0029* (2013.01); *H02J 7/007* (2013.01); *H02J 7/0073* (2013.01); *H02J 2007/0039* (2013.01); *H05B 37/0281* (2013.01)

(58) Field of Classification Search
CPC ....... H02J 7/007; H02J 7/0073; H02J 7/0052; H02J 2007/0039; H05B 37/0281
USPC .......................... 320/107, 133, 134, 136, 139
See application file for complete search history.

(56) References Cited

U.S. PATENT DOCUMENTS

| | | | | | |
|---|---|---|---|---|---|
| 3,927,361 | A | * | 12/1975 | Macharg | 320/149 |
| 4,383,211 | A | * | 5/1983 | Staler | 320/102 |
| 4,668,901 | A | * | 5/1987 | Furukawa | 320/149 |
| 5,861,730 | A | * | 1/1999 | Lee | 320/106 |
| 6,094,034 | A | * | 7/2000 | Matsuura | 320/134 |
| 7,372,235 | B2 | * | 5/2008 | Mori et al. | 320/125 |
| 7,498,769 | B1 | * | 3/2009 | Potanin et al. | 320/125 |
| 7,548,041 | B2 | * | 6/2009 | Zemke et al. | 320/133 |
| 7,705,563 | B2 | * | 4/2010 | Ibaraki | 320/128 |
| 7,843,173 | B2 | * | 11/2010 | Okada | 320/163 |
| 7,952,330 | B2 | * | 5/2011 | Mori | 320/150 |
| 8,212,571 | B2 | * | 7/2012 | Emori et al. | 324/522 |
| 8,450,982 | B2 | * | 5/2013 | Matsuda et al. | 320/150 |
| 8,558,516 | B2 | * | 10/2013 | Takahashi et al. | 320/163 |
| 8,674,661 | B2 | * | 3/2014 | Yamada | 320/134 |
| 8,841,880 | B2 | * | 9/2014 | Aradachi | 320/107 |
| 2010/0188051 | A1 | * | 7/2010 | Yamazaki et al. | 320/148 |
| 2012/0293125 | A1 | * | 11/2012 | Suzuki | 320/116 |
| 2013/0051104 | A1 | * | 2/2013 | Nakano et al. | 363/131 |
| 2013/0141070 | A1 | * | 6/2013 | Goessling et al. | 323/284 |
| 2013/0187612 | A1 | * | 7/2013 | Aiura | 320/118 |
| 2014/0320070 | A1 | * | 10/2014 | Nakamoto et al. | 320/107 |

* cited by examiner

*Primary Examiner* — Helen Rossoshek
(74) *Attorney, Agent, or Firm* — IPUSA, PLLC

(57) ABSTRACT

A charge circuit includes a current limiting circuit configured to limit a current input from an input terminal; a first transistor connected between an output terminal of the current limiting circuit and a secondary battery; a charge control circuit configured to turn the first transistor on and off to start and stop supply of a charge current to the secondary battery; a second transistor configured to output a current proportional to the charge current flowing through the first transistor; and a charge timer configured to generate clock pulses according to the current output from the second transistor. The charge control circuit is configured to turn off the first transistor to stop the supply of the charge current to the secondary battery when the number of the clock pulses reaches a predetermined number.

3 Claims, 4 Drawing Sheets

US 9,166,432 B2

CHARGE CIRCUIT

CROSS-REFERENCE TO RELATED APPLICATION

The present application is based upon and claims the benefit of priority of Japanese Patent Application No. 2012-029129, filed on Feb. 14, 2012, the entire contents of which are incorporated herein by reference.

BACKGROUND OF THE INVENTION

1. Field of the Invention

An aspect of this disclosure relates to a charge circuit.

2. Description of the Related Art

Portable terminals driven by a secondary battery such as a lithium-ion battery are widely used. U.S. Pat. No. 7,548,041, for example, discloses a charge circuit for charging a secondary battery of a portable terminal. The charge circuit includes a charge timer to ensure safety.

FIG. 1 is a circuit diagram illustrating a related-art charge circuit. A charge circuit 10 illustrated in FIG. 1 includes an IN terminal receiving a current (charge current) from an AC adapter and a BAT terminal connected to a secondary battery. The charge circuit 10 also includes a switching element M1 for stopping charging and a charge timer 11. In the charge circuit 10, the secondary battery connected to the BAT terminal is charged by a current input from the IN terminal. Also in the charge circuit 10, a predetermined clock number is set in the charge timer 11. When the number of counted clock pulses reaches the predetermined clock number, the switching element M1 is turned off to shut off the charge current and stop the charging.

FIG. 2 is a circuit diagram illustrating another related-art charge circuit. A charge circuit 20 illustrated in FIG. 2 includes in addition to an IN terminal and a BAT terminal, an OUT terminal that outputs a current input from the IN terminal. The current output from the OUT terminal is supplied to a portable terminal driven by a secondary battery as an operating current.

In the related-art charge circuit 20 of FIG. 2, the current input from the IN terminal is divided into a current that flows to the OUT terminal and a current (charge current) that flows to the BAT terminal. Accordingly, with this configuration, the level of the charge current flowing to the BAT terminal may sometimes be decreased. Even in such a case, however, charging is stopped by a charge timer 21 when a predetermined period of time passes. As a result, the secondary battery may be insufficiently charged.

To prevent charging from being stopped while the battery charge is insufficient, the clock number set in the charge timer 21 may be increased to increase the predetermined period of time. However, increasing the predetermined period of time may reduce the safety the charge timer 21 is intended to provide.

SUMMARY OF THE INVENTION

In an aspect of this disclosure, there is provided a charge circuit that includes a current limiting circuit configured to limit a current input from an input terminal; a first transistor connected between an output terminal of the current limiting circuit and a secondary battery; a charge control circuit configured to turn the first transistor on and off to start and stop supply of a charge current to the secondary battery; a second transistor configured to output a current proportional to the charge current flowing through the first transistor; and a charge timer configured to generate clock pulses according to the current output from the second transistor. The charge control circuit is configured to turn off the first transistor to stop the supply of the charge current to the secondary battery when the number of the clock pulses reaches a predetermined number.

DESCRIPTION OF THE PREFERRED EMBODIMENTS

According to an aspect of this disclosure, "charging time", which indicates a period of time after which charging is stopped, is changed according to a change in a charge current for constant current charging.

First Embodiment

Figure 1:
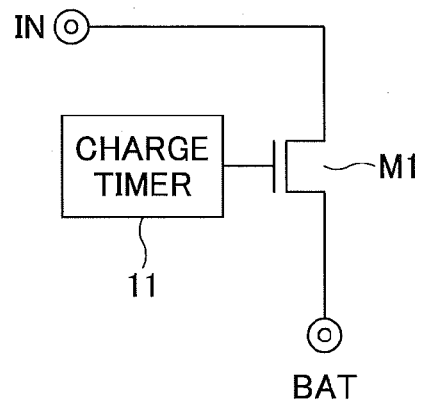
FIG. 1 is a circuit diagram illustrating a related-art charge circuit.
Figure 2:
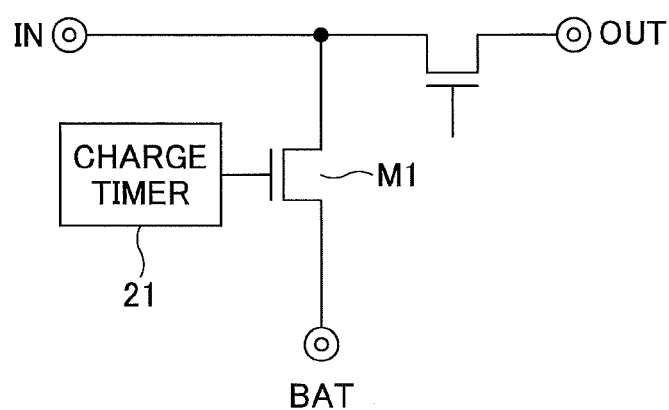
FIG. 2 is a circuit diagram illustrating another related-art charge circuit.
Figure 3:
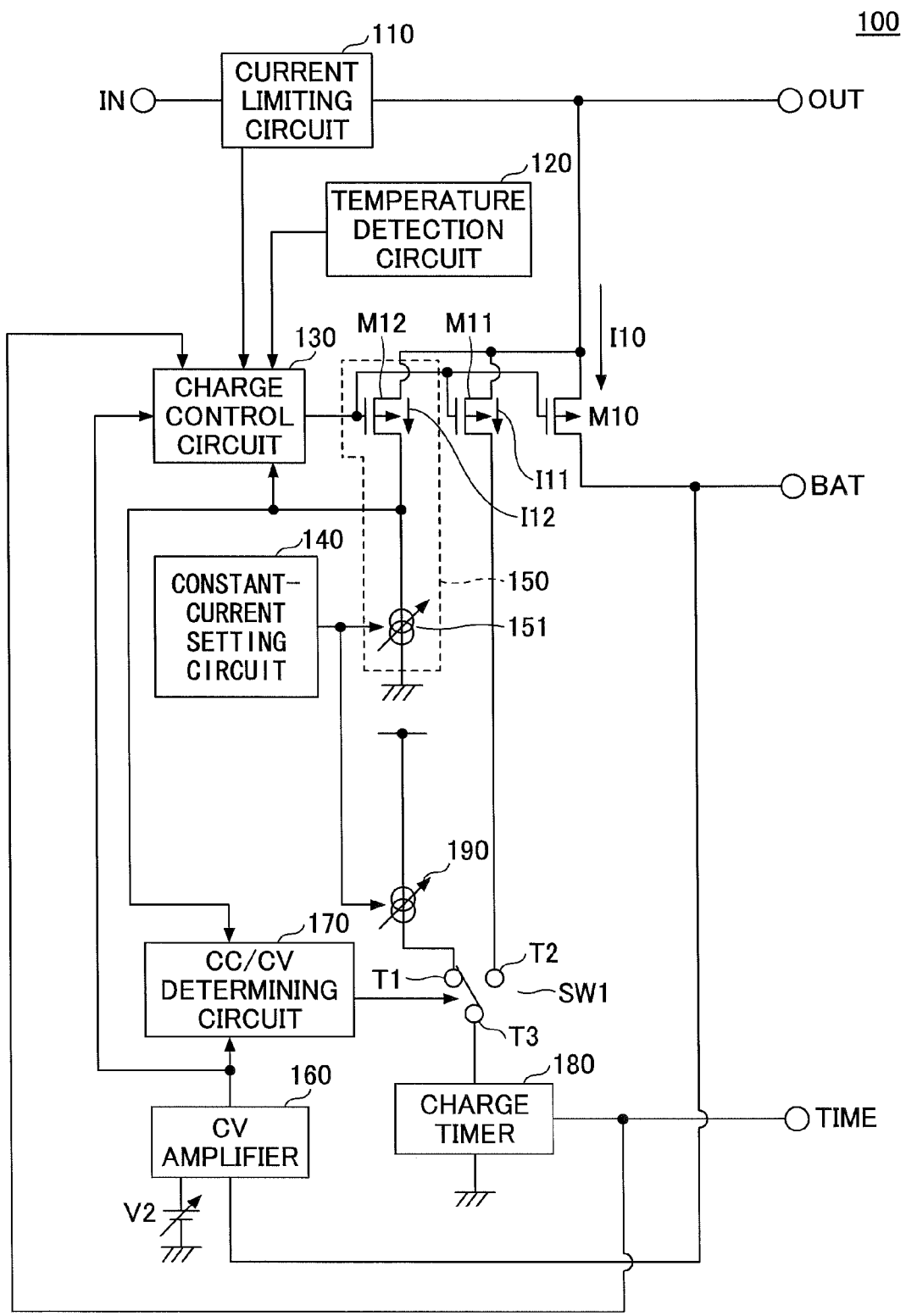
FIG. 3 is a circuit diagram illustrating a charge circuit according to a first embodiment.

A first embodiment is described below with reference to the accompanying drawings. FIG. 3 is a circuit diagram illustrating a charge circuit 100 according to the first embodiment.

The charge circuit 100 may include a current limiting circuit 110, a temperature detection circuit 120, a charge control circuit 130, a constant-current setting circuit 140, a constant current (CC) amplifier 150, a constant voltage (CV) amplifier 160, a CC/CV determining circuit 170, a charge timer 180, a constant-current source 190, and a switch SW1.

The charge circuit 100 may also include an IN terminal, an OUT terminal, a BAT terminal, a TIME terminal, and transistors M10, M11, and M12.

A power supply such as an alternating current (AC) adapter or a Universal Serial Bus (USB) cable is connected to the IN terminal to input a current to the charge circuit 100. A secondary battery is connected to the BAT terminal and is charged by the charge circuit 100. The OUT terminal is connected to a device including the secondary battery connected to the BAT terminal. With the charge circuit 100 of the present embodiment, it is possible to charge the secondary battery connected to the BAT terminal as well as drive the device connected to the OUT terminal with the current input from the IN terminal.

The current limiting circuit 110 limits the current input from the IN terminal within a predetermined current level. The temperature detection circuit 120 detects the temperature of, for example, the secondary battery and outputs the detected temperature to the charge control circuit 130.

The charge control circuit 130 turns the transistor M10 on and off to control supply of a charge current to the BAT terminal. The charge control circuit 130 also turns the transistors M11 and M12 on and off. Details of the transistors M11 and M12 are described later.

The constant-current setting circuit 140 sets values of constant currents generated by a constant current source 151 of the CC amplifier 150 and the constant current source 190.

The CC amplifier 150 is provided for constant-current charging and is implemented by the constant-current source 151. The CC amplifier 150 detects whether the charge current supplied to the BAT terminal has reached a predetermined current level. The CV amplifier 160 is provided for constant-voltage charging. The CV amplifier 160 compares a reference voltage V2 and the voltage of the secondary battery to determine whether the voltage of the secondary battery has reached the reference voltage V2.

An output from the CC amplifier 150 and an output from the CV amplifier 160 are input to the charge control circuit 130. Based on the output from the CC amplifier 150 and the output from the CV amplifier 160, the charge control circuit 130 performs either constant-current charging or constant-voltage charging.

The CC/CV determining circuit 170 determines whether the charging method being employed by the charge control circuit 130 is constant-current charging or constant-voltage charging based on the output from the CC amplifier 150 and the output from the CV amplifier 160. The CC/CV determining circuit 170 controls the switch SW1 based on the determination result.

The charge timer 180 generates clock pulses for counting charging time (a period of time after which charging is stopped). The charge timer 180 may be implemented by, for example, an oscillator. When the charging method is constant-current charging, the oscillator (charge timer 180) changes its oscillating frequency based on a current corresponding to the charge current. In the present embodiment, the frequency of the clock pulses generated by the oscillator (charge timer 180) changes as the oscillating frequency changes and as a result, the charging time obtained by counting the clock pulses changes. The clock pulses output from the charge timer 180 are output via the TIME terminal to the device. Also, the clock pulses from the charge timer 180 are input to the charge control circuit 130. The charge control circuit 130 stops charging (i.e., turns off the transistor M10) when the number of the clock pulses output from the charge timer 180 reaches a predetermined number.

The constant current source 190 is connected to a terminal T1 of the switch SW1 and supplies a constant current set by the constant-current setting circuit 140 to the terminal T1.

A terminal T2 of the switch SW1 is connected to the drain of the transistor M11, and a terminal T3 of the switch SW1 is connected to the charge timer 180. When determining that the charging method is constant-voltage charging, the CC/CV determining circuit 170 controls the switch SW1 to connect the terminal T1 and the terminal T3. When determining that the charging method is constant-current charging, the CC/CV determining circuit 170 controls the switch SW1 to connect the terminal T1 and the terminal T2. In this case, the charge timer 180 is connected to the drain of the transistor M11.

In the charge circuit 100 of the present embodiment, the transistors M10, M11, and M12 are implemented by PMOS transistors, and the sources of the transistors M10, M11, and M12 are connected to the output terminal of the current limiting circuit 110. The gates of the transistors M10, M11, and M12 are connected to the charge control circuit 130. The drain of the transistor M10 is connected to the BAT terminal. The drain of the transistor M11 is connected to the terminal T2 of the switch SW1.

The drain of the transistor M12 is connected to the constant-current source 151. In the present embodiment, a current at the node between the drain of the transistor M12 and the constant-current source 151 is supplied to the charge control circuit 130 and the CC/CV determining circuit 170 as the output of the CC amplifier 150.

Also in the present embodiment, a source-drain current I11 and a source-drain current I12 of the transistor M11 and the transistor M12 are proportional to a source-drain current I10 of the transistor M10. The current I10 is a charge current supplied to the BAT terminal. According to the present embodiment, when the CC/CV determining circuit 170 determines that constant-current charging is being used as the charging method, the source-drain current I11 of the transistor M11 changes according to the changes of the charge current.

For example, when the charge current decreases during constant-current charging, the current I11 also decreases. In this case, the current supplied to the charge timer 180 decreases, the frequency of the clock pulses generated by the charge timer 180 is lowered, and as a result, the charging time increases.

Thus, the charge circuit 100 of the present embodiment can change the charging time according to changes in the charge current.

Next, a charge circuit according to the first embodiment is described in more detail with reference to FIG. 4.

Figure 4:
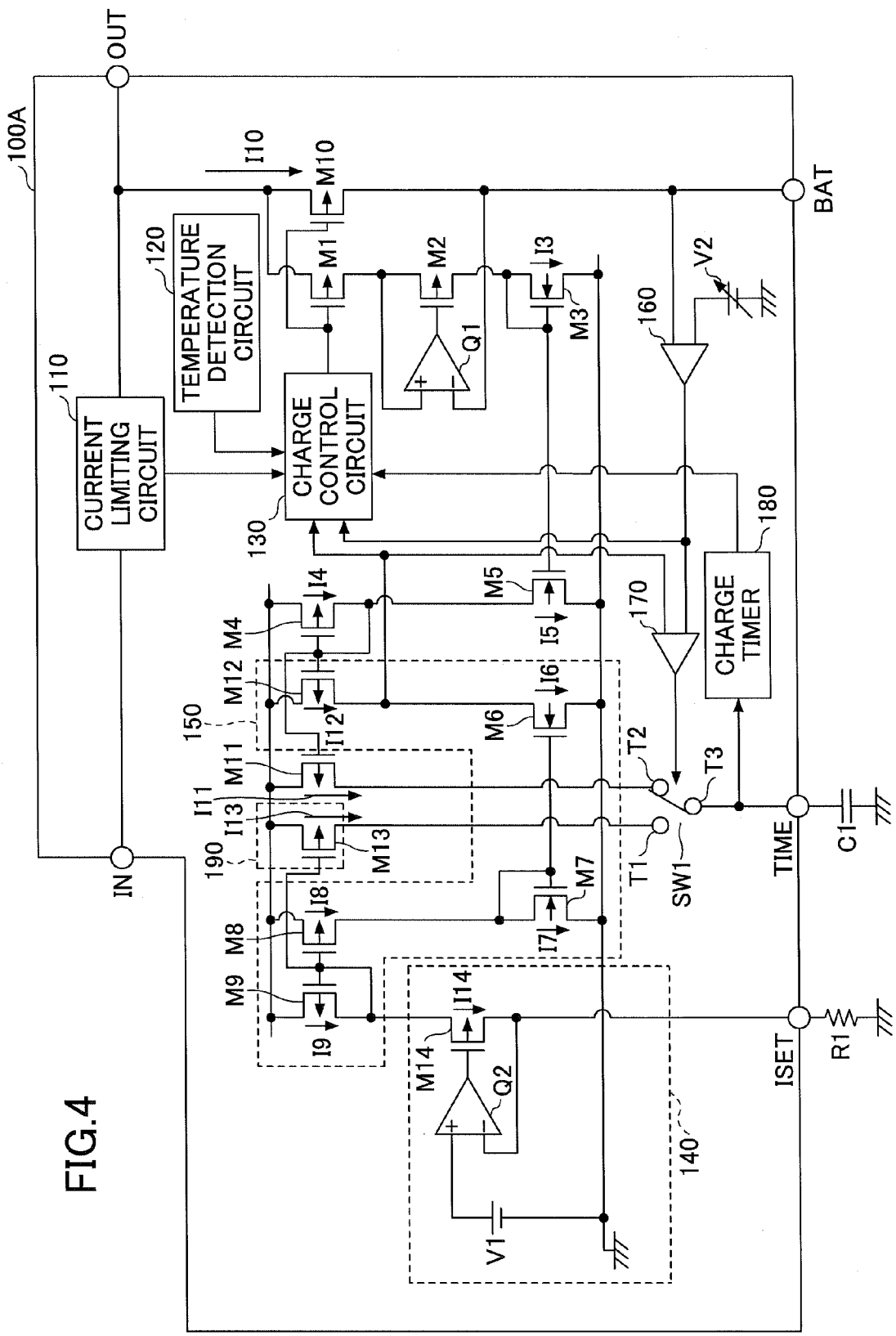
FIG. 4 is a circuit diagram illustrating a charge circuit according to the first embodiment.

A charge circuit 100A of FIG. 4 includes transistors M1 through M14, amplifiers Q1 and Q2, a reference voltage source V1 (that outputs a reference voltage V1), and an ISET terminal in addition to the components and terminals of the charge circuit 100 of FIG. 3.

The transistors M1, M2, M4, and M8-M14 are implemented by PMOS transistors. The transistors M3 and M5-M7 are implemented by NMOS transistors.

The transistor M1 outputs a current that is proportional to the source-drain current I10 (charge current) of the transistor M10. The transistors M2 and M3 and the amplifier Q1 constitute an auxiliary circuit that enables the transistors M1 and M10 as a current mirror. The transistors M4 and M5 determine the source-drain currents I11 and I12 of the transistors M11 and M12.

The transistors M6 through M9 and M12 constitute the CC amplifier 150. The transistors M6 through M9 constitute the constant-current source 151 of the CC amplifier 150. The transistor M14, the amplifier Q2, and the reference voltage source V1 constitute the constant-current setting circuit 140 for determining the current of the constant-current source 151. Also, the transistor M13 implements the constant-current source 190.

Connections among the components of the charge circuit 100A are described below.

The source of the transistor M1 is connected to the source of the transistor M10, and the source of the transistor M10 is also connected to the output terminal of the current limiting circuit 110. The gates of the transistors M1 and M10 are connected to the output terminal of the charge control circuit 130. The drain of the transistor M10 is connected to the BAT terminal.

The drain of the transistor M1 is connected to the source of the transistor M2. The gate of the transistor M2 is connected to the output terminal of the amplifier Q1, and the drain of the transistor M2 is connected to the source of the transistor M3. The source of the transistor M3 is connected to the gate of the transistor M3, and the drain of the transistor M3 is grounded. Thus, the transistor M3 implements a current source.

The amplifier Q1 is a drain-drain correction amplifier for enabling the transistors M1 and M10 to function as a current mirror. The non-inverting input terminal of the amplifier Q1 is connected to the source of the transistor M2, and the inverting input terminal of the amplifier Q1 is connected to the drain of the transistor M10.

The gate of the transistor M5 is connected to the gate of the transistor M3, the source of the transistor M5 is grounded, and the drain of the transistor M5 is connected to the drain of the transistor M4. The gate of the transistor M4 is connected to the drain of the transistor M4 and the gates of the transistors M11 and M12. The source of the transistor M4 is connected to the sources of the transistors M8, M9, M11, M12, and M13. The drain of the transistor M11 is connected to the terminal T2 of the switch SW1.

The drain of the transistor M12 is connected to the drain of the transistor M6. The drain of the transistor M12 functions as an output terminal of the CC amplifier 150 and is connected to the charge control circuit 130 and one input terminal of the CC/CV determining circuit 170. The source of the transistor M6 is grounded. The gate of the transistor M6 is connected to the gate and the drain of the transistor M7.

The drain of the transistor M7 is connected to the drain of the transistor M8. The gate of the transistor M8 is connected to the gates of the transistors M9 and M13. The gate of the transistor M9 is connected to the drain of the transistor M9. The drain of the transistor M9 is connected to the source of the transistor M14.

The gate of the transistor M14 is connected to the output terminal of the amplifier Q2, and the drain of the transistor M14 is connected to the inverting input terminal of the amplifier Q2.

One input terminal of the CV amplifier 160 is connected to the BAT terminal. The other input terminal of the CV amplifier 160 is connected to a reference voltage source V2 (which outputs a reference voltage V2). The output terminal of the CV amplifier 160 is connected to the charge control circuit 130 and the other input terminal of the CC/CV determining circuit 170. The output terminal of the CC/CV determining circuit 170 is connected to the switch SW1 to control the switch SW1.

The terminal T3 of the switch SW1 is connected to the charge timer 180 and the TIME terminal. The output terminal of the charge timer 180 connected to the charge control circuit 130.

In the present embodiment, the transistors M3 and M5 constitute a current mirror. Accordingly, a source-drain current I5 of the transistor M5 is the same as or proportional to a source-drain current I3 of the transistor M3. A source-drain current I4 of the transistor M4 is determined by the current I5. Accordingly, the current I4 is the same as or proportional to the current I3. Since the current I3 is proportional to the current I10, the current I4 is also proportional to the current I10.

In the present embodiment, the transistors M4, M11, and M12 also constitute a current mirror. The source-drain current I11 of the transistor M11 and the source-drain current I12 of the transistor M12 are determined by the current I4. In other words, the current I11 and the current I12 are the same as or proportional to the current I4.

Accordingly, the current I11 and the current I12 are proportional to the current I10, i.e., the charge current.

Also, in the present embodiment, the transistors M9, M8, and M13 constitute a current mirror. A source-drain current I8 of the transistor M8 and a source-drain current I13 of the transistor M13 are determined by a source-drain current I9 of the transistor M9. Since a source-drain current I14 of the transistor M14 is constant, the current I9 is also constant. Accordingly, the current I13 is also a constant current.

Further in the present embodiment, the transistors M6 and M7 constitute a current mirror. A source-drain current I7 of the transistor M7 is a constant current determined by the current I8. Therefore, a drain-source current I6 of the transistor M6 is also a constant current.

The CV amplifier 160 compares a voltage at the BAT terminal (i.e., the voltage of the secondary battery) with the reference voltage V2. When the voltage at the BAT terminal reaches the reference voltage V2, the CV amplifier 160 outputs a voltage attainment signal indicating that the voltage at the BAT terminal has reached the reference voltage V2.

The CC amplifier 150 compares the current I12, which is proportional to the charge current, with the constant current I6. When the current I12 reaches the constant current I6, the CC amplifier 150 outputs a current attainment signal indicating that the current I12 has reached the constant current I6.

The CC/CV determining circuit 170 may be configured, for example, to determine that constant-current charging is employed as the charging method and cause the switch SW1 to connect the terminal T3 to the terminal T2 when the current attainment signal is not being output from the CC amplifier 150. The CC/CV determining circuit 170 may also be configured to determine that constant-voltage charging is employed as the charging method and cause the switch SW1 to connect the terminal T3 to the terminal T1 when the voltage attainment signal is output from the CV amplifier 160.

Operations of the charge circuit 100A, which are performed when the charge current decreases while the charging method determined by the CC/CV determining circuit 170 is constant-current charging, are described below. The charge current decreases, for example, when the capability of a power supply connected to the IN terminal is insufficient or when the current input via the current limiting circuit 110 is limited due to an increase in the temperature of an IC on which the charge circuit 100A is mounted.

According to the present embodiment, when the charge current (the current I10) decreases, the current I11 proportional to the charge current also decreases. As a result, the current input via the switch SW1 to the charge timer 180 also decreases.

When the input current decreases, the frequency of clock pulses generated by the charge timer 180 is lowered. As a result, the period of time (charging time) taken by the charge control circuit 130 to count a predetermined number of the clock pulses increases.

Also in the present embodiment, when the charge current increases, the current I11 proportional to the charge current increases and the frequency of clock pulses generated by the charge timer 180 becomes higher. As a result, the period of time (charging time) taken by the charge control circuit 130 to count the predetermined number of the clock pulses decreases.

Thus, the charge circuit 100A of the present embodiment can change the charging time according to changes in the charge current. This in turn eliminates the need to take into account a decrease in the charge current in setting charging time and thereby makes it possible to set a safe charging time. Thus, the present embodiment makes it possible to sufficiently charge a secondary battery while ensuring safety.

According to the present embodiment, the current limiting circuit 110 is provided to limit the current input to the charge circuit 100A. This configuration makes it possible to prevent a high current from being output via the OUT terminal.

In the present embodiment, a resistor R1 connected to the ISET terminal and a capacitor C1 connected to the TIME terminal are provided outside of the charge current 100A. However, the resistor R1 and the capacitor C1 may be included in the charge circuit 100A.

Second Embodiment

A second embodiment is described below with reference to the accompanying drawings. The second embodiment is different from the first embodiment in that a voltage proportional to the charge current is used. Below, differences from the first embodiment are mainly described. Therefore, same reference numbers are assigned to components corresponding to those in the first embodiment, and their descriptions are omitted.

Figure 5:
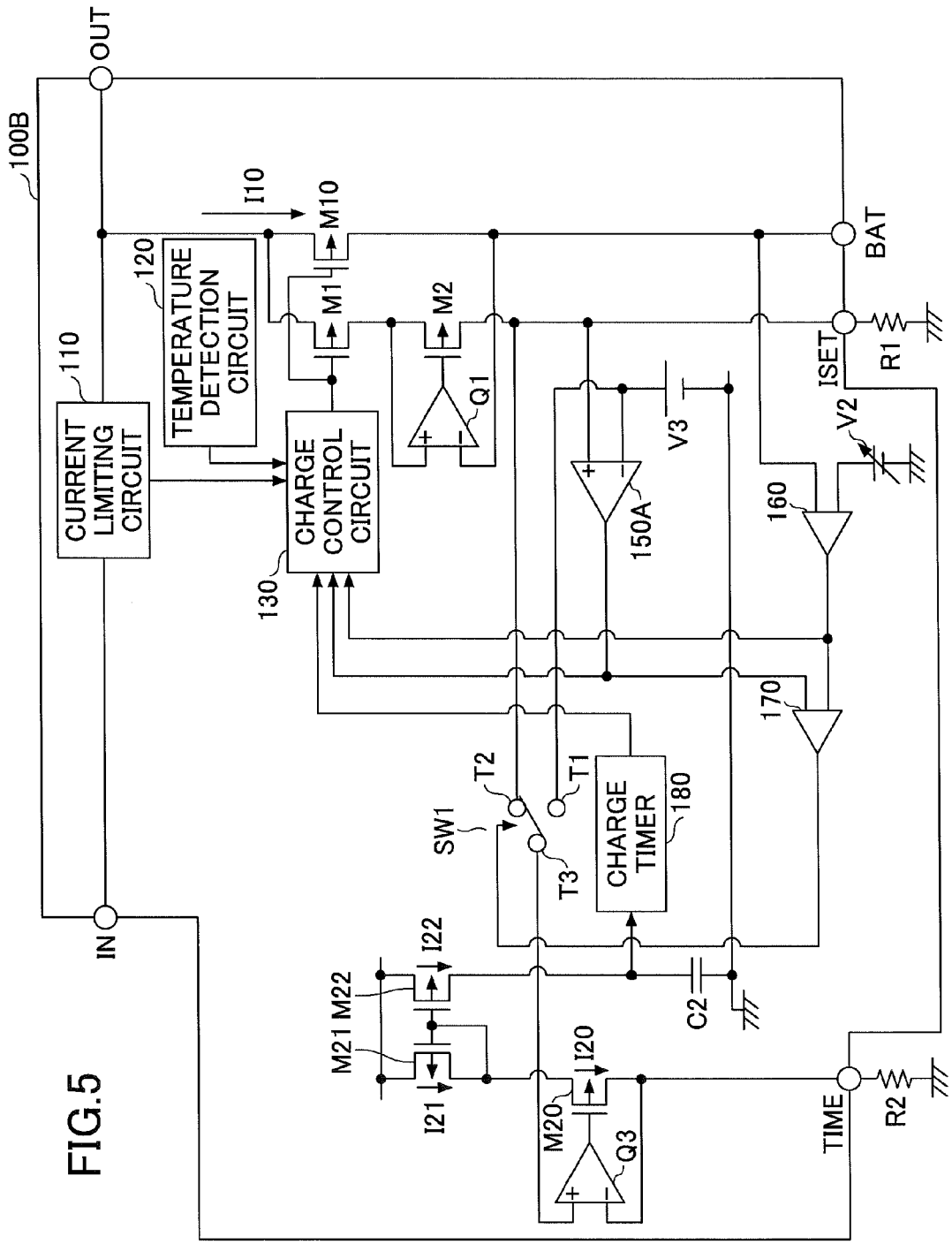
FIG. 5 is a circuit diagram illustrating a charge circuit according to a second embodiment.

FIG. 5 is a circuit diagram illustrating a charge circuit according to the second embodiment.

A charge circuit 100B of the second embodiment includes a current limiting circuit 110, a temperature detecting circuit 120, a charge control circuit 130, a CC amplifier 150A, a CV amplifier 160, a CC/CV determining circuit 170, a charge timer 180, an amplifier Q1, an amplifier Q3, transistors M1, M2, M10, M20, M21, and M22 implemented by PMOS transistors, reference voltage sources V2 and V3, a capacitor C2, and resistors R1 and R2.

The non-inverting input terminal of the CC amplifier 150A is connected to the drain of the transistor M2. With this configuration, a voltage corresponding to a current proportional to the current I10, i.e., a charge current, is applied to the non-inverting input terminal of the CC amplifier 150A. The inverting input terminal of the CC amplifier 150A is connected to the reference voltage source V3. The output terminal of the CC amplifier 150A is connected to the charge control circuit 130 and one input terminal of the CC/CV determining circuit 170.

The inverting input terminal of the amplifier Q3 is connected to the TIME terminal. The resistor R2 is connected to the TIME terminal. The non-inverting input terminal of the amplifier Q3 is connected to the terminal T3 of the switch SW1. The output terminal of the amplifier Q3 is connected to the gate of the transistor M20.

The drain of the transistor M20 is connected to the TIME terminal, and the source of the transistor M20 is connected to the drain of the transistor M21. The gate of the transistor M21 is connected to the drain of the transistor M21 and the gate of the transistor M22. The source of the transistor M21 is connected to the source of the transistor M22, and the drain of the transistor M22 is connected to the charge timer 180 and the capacitor C2.

According to the second embodiment, when the terminal T2 and the terminal T3 of the switch SW1 are connected by the CC/CV determining circuit 170, a voltage corresponding to a current proportional to the current I10 is input to the non-inverting input terminal of the amplifier Q3.

A source-drain current I20 of the transistor M20 depends on the output from the amplifier Q3. Accordingly, the current I20 is proportional to the current I10. Once the current I20 is determined, a source-drain current I21 of the transistor M21 is also determined.

The transistors M21 and M22 constitute a current mirror. Therefore, a source-drain current I22 of the transistor M22 is the same as or proportional to the current I21. Accordingly, the current I22 is proportional to the current I10.

Operations of the charge timer 180 performed when the current I22 proportional to the current I10 is input to the charge timer 180 are substantially the same as those described in the first embodiment.

With the above configuration, the charge circuit 100B of the second embodiment can also change the charging time according to changes in the charge current. This in turn eliminates the need to take into account a decrease in the charge current in setting charging time and thereby makes it possible to set a safe charging time. Thus, the second embodiment also makes it possible to sufficiently charge a secondary battery while ensuring safety.

Charge circuits according to the embodiments are described above. However, the present invention is not limited to the specifically disclosed embodiments, and variations and modifications may be made without departing from the scope of the present invention.

An aspect of this disclosure makes it possible to provide a charge circuit that can sufficiently charge a secondary battery while ensuring safety.

What is claimed is:

1. A charge circuit, comprising:
   a current limiting circuit configured to limit a current input from an input terminal;
   a first transistor connected between an output terminal of the current limiting circuit and a secondary battery;
   a charge control circuit configured to turn the first transistor on and off to start and stop supply of a charge current to the secondary battery;
   a second transistor configured to output a current proportional to the charge current flowing through the first transistor; and
   a charge timer configured to generate clock pulses according to the current output from the second transistor,
   wherein the charge control circuit is configured to turn off the first transistor to stop the supply of the charge current to the secondary battery when a number of the clock pulses reaches a predetermined number, and
   wherein the charge circuit further comprises:
   a switch configured to control connection between the second transistor and the charge timer;
   a determining circuit configured to determine whether constant-current charging or constant-voltage charging is employed as a charging method for charging the secondary battery and control the switch based on a result of the determination, and
   a third transistor having a drain connected to a constant current source at a connection point,
   wherein each of the first, second and third transistors has a source connected to the current limiting circuit and a gate connected to the charge control circuit,
   wherein current of the connection point is provided to the charge control circuit and the determining circuit, and
   wherein the determining circuit is configured to control the switch to connect the second transistor and the charge timer when the constant-current charging is employed as the charging method.

2. The charge circuit as claimed in claim 1, further comprising:
   a constant-current amplifier configured to determine whether the charge current has reached a reference current; and
   a constant-voltage amplifier configured to determine whether a voltage of the secondary battery has reached a reference voltage,
   wherein the determining circuit is configured to determine whether the constant-current charging or the constant-voltage charging is employed as the charging method based on outputs from the constant-current amplifier and the constant-voltage amplifier.

3. The charge circuit as claimed in claim 1, further comprising:
   a battery terminal connected to the secondary battery charged by the charge current; and
   an output terminal configured to output the current input from the input terminal to a device including the secondary battery.

* * * * *